Jan. 15, 1946. G. G. SOMERVILLE 2,393,198
WELDING APPARATUS
Filed March 6, 1943 2 Sheets-Sheet 1
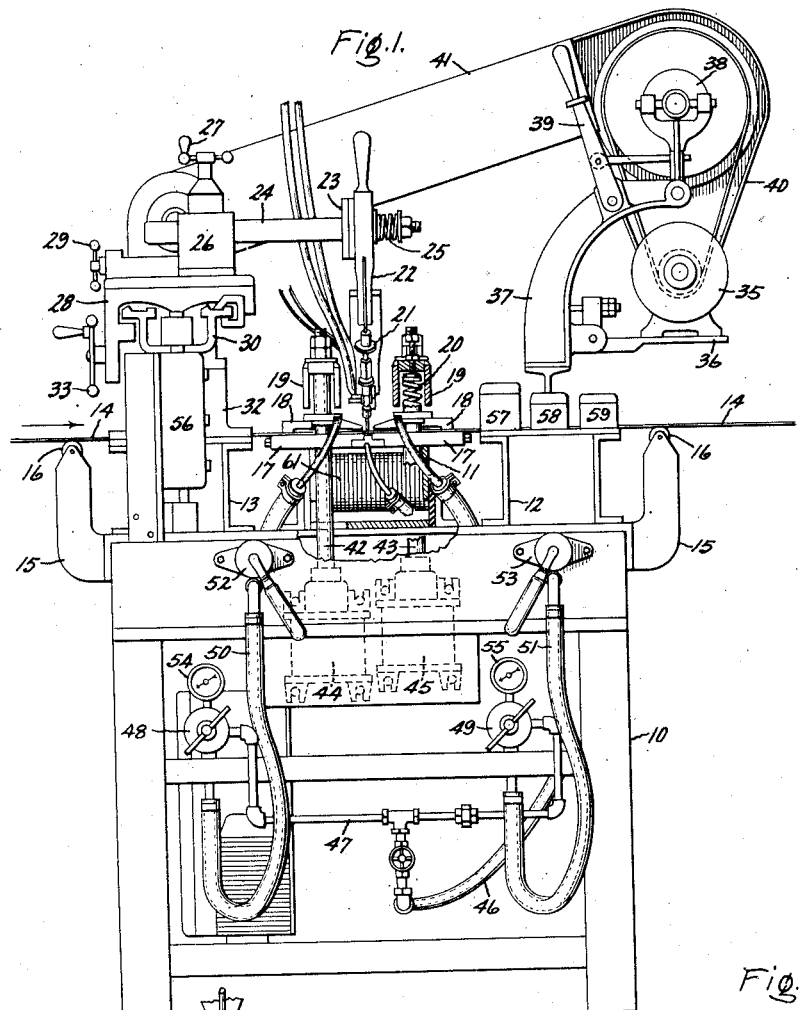
Inventor:
Gareth G. Somerville,
by Harry E. Dunham
His Attorney.

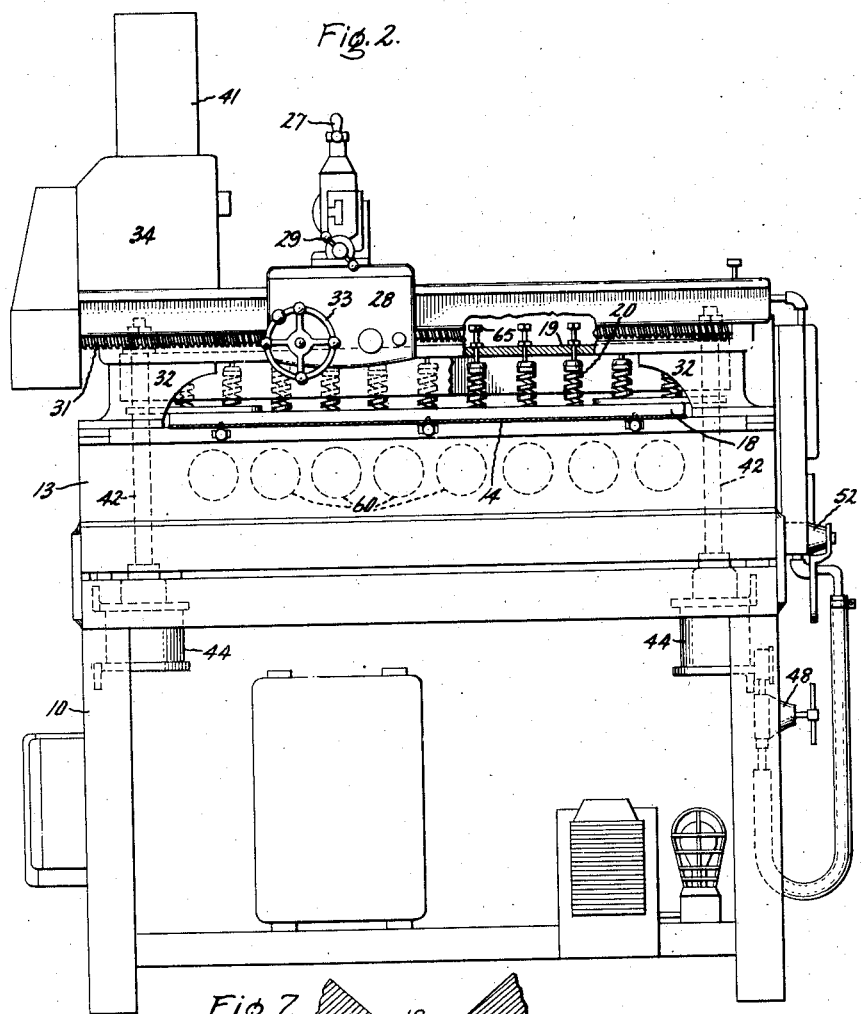
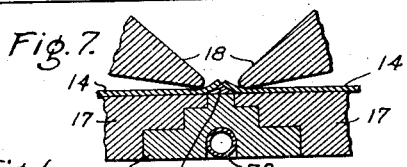
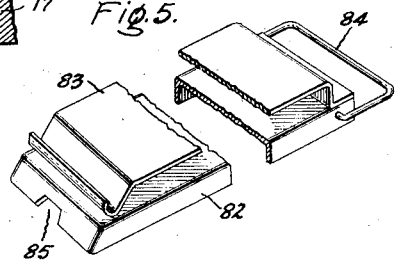
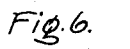
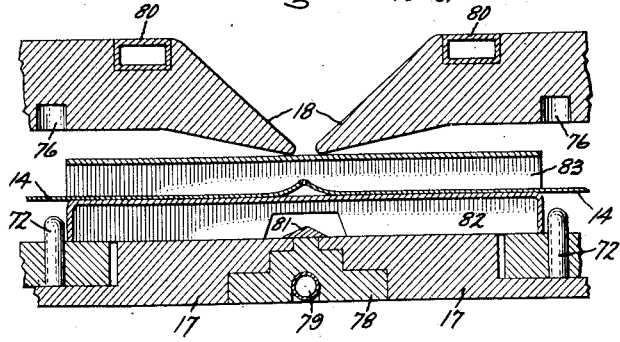

Patented Jan. 15, 1946

2,393,198

UNITED STATES PATENT OFFICE 2,393,198

WELDING APPARATUS

Gareth G. Somerville, Pittsfield, Mass., assignor to General Electric Company, a corporation of New York Application March 6, 1943, Serial No. 478,235

11 Claims. (Cl. 113—99)

My invention relates to welding apparatus which is particularly suited for the butt fusion welding of thin sheets of silicon steel to form strips from which are cut the parts of magnetic core circuits used in electrical apparatus.

It is desirable to use for this purpose an atomic hydrogen torch and to control the arc of such torch by a magnetic field which acts on the arc after spanning a high reluctance air gap directly under the seam between the parts being welded, as described and claimed in United States Letters Patent No. 2,259,118, granted October 14, 1941, on an invention made by me jointly with James T. Catlett.

As pointed out in the above identified Letters Patent, the heat of welding must be kept from running back into the sheets and producing unpermissible distortion at the seam. I have found that the adjustment and fit of the work clamps are extremely important when butt fusion welding sheets of ten thousandths of an inch in thickness. A variation of one thousandth of an inch although small in itself is ten per cent of the sheet thickness and may be enough to produce a defective weld. The adjustment and fit of the clamps are extremely important because an opening of one half thousandth of an inch between a sheet and the edge of a clamp may result in an overheated section and consequently a poor weld. Furthermore, some arrangement must be provided for preventing excessive wear of the welding clamps and for adjusting them to compensate for such wear. Means should also be provided for preventing the passage of sheets through the clamp from damaging the edge portions of the clamp which engage the work on each side of the seam.

It is an object of my invention to provide an improved sheet clamp embodying these features.

It is a further object of my invention to provide a sheet clamp embodying a flexible jaw member which is yieldingly forced into engagement with the sheet held thereby.

It is also an object of my invention to provide means for adjusting and distributing the pressure applied to a flexible jaw member through the agency of a plurality of spring members located lengthwise of and acting on the jaw member.

It is another object of my invention to provide a clamp in which the sheet support and the sheet engaging jaw member extending across this support are provided with a plurality of pins and pin sockets for positioning the sheet engaging portion of said jaw member parallel with the edge of a sheet of material also positioned on said support by said pins.

It is also an object of my invention to provide means held in place by said pins and adapted to be inserted between said support and said jaw members for guiding sheet material over said pins and for protecting said pins and said work engaging portions of said jaw members from the abrading effects of said sheets during their passage through the work clamp.

It is a further object of my invention to provide a sheet clamp in which the abutting edge portions of the sheets are stiffened by being crimped when held against a support having angularly disposed surfaces which intersect one another along a line of welding and form on the sheet support a ridge of triangular cross section.

Other objects of my invention will become apparent from a consideration of the welding apparatus illustrated and described in the accompanying drawings.

In these drawings, Figs. 1 and 2 are respectively end and side views of a welding machine embodying my improved sheet clamp; Fig. 3 is a cross section of the sheet engaging portions of the work clamp showing the relationship of parts thereof; Fig. 4 is a side view of the parts shown in Fig. 3; Figs. 5 and 6 are views showing respectively the construction of a guide bar for directing the sheet material between the parts of the work clamp and its position in the work clamp; and Fig. 7 is a cross section showing the work as held by a modified form of work clamp employing a triangular crimp bar arrangement for stiffening the clamped edge portions of the sheets at the seam to be welded between them. Fig. 6 also shows this crimp bar form of work clamp.

The welding machine illustrated embodies means for traversing an atomic hydrogen torch lengthwise of the seam between sheets of material whose end portions are held in a work clamp of my improved construction.

This work clamp comprises a rigid magnet frame having flat sheet supporting pole pieces of magnetic material separated from one another by a narrow air gap at their sheet supporting surfaces. A rigid beam extends across each of these pole pieces and acts on a flexible jaw member located between it and its pole piece through the agency of a plurality of spring members located lengthwise of and between each beam and each jaw member. Means are provided for individually adjusting the pressures transmitted by each of the spring members, and a plurality of pins and pin sockets in the magnet frame and the jaw members position the jaw members relative to the frame on opposite sides of and parallel with the non-magnetic gap between the pole pieces of the magnet frame and the seam to be welded between sheets of material also positioned on the pole pieces of the magnet frame by these pins engaging the sheets through perforations in their end portions.

Each jaw member has a heel and a toe portion extending lengthwise thereof and limiting its contact with the sheet it engages. The toe portion has a tapered edge which engages the sheet near the steam to be welded, and a flat heel portion which engages the sheet along a zone spaced from the seam on the other side of its toe portion. Cooling means are provided for abstracting heat from the sheets during welding. These cooling means extend lengthwise of the toe portions of the jaw members and along a bar of non-magnetic material which is located between the pole pieces of the magnet frame and spaced from their sheet supporting surfaces.

Means including rods extending through the end portions of associated beams and jaw members are provided for moving them toward and away from the pole pieces of the magnet frame. Connections are provided between these rods and beams for applying clamping pressure between the beams and the magnet frame. Connections are also provided between these rods and the jaw members for moving the jaw members away from pole pieces of the magnet frame after movement of the rods has released clamping pressure between the beams and the magnet frame.

Fluid operated means are provided for actuating the rods of each of said beams and its associated jaw members, and means including an adjustable fluid pressure regulator is provided between each of these fluid operated means and a source of fluid pressure for determining the clamping pressure exerted by each of these fluid operated means on each of the beams.

A non-magnetic bar of triangular cross section forming a ridge between the flat sheet supporting surfaces of the pole pieces may be used to crimp and stiffen the sheet edges which are held with the seam between them extending along the projecting edge portion of this triangular bar. When such construction is used, the bar of non-magnetic material between the pole pieces extends to and into engagement with the flat supporting surface of this triangular bar.

As shown in Figs. 1 and 2 of the drawings, the welding machine comprises a table 10 upon whose supporting surface are located a rigid magnet frame 11 and box beams 12 and 13 on opposite sides thereof. The upper surfaces of the magnet frame and of beams 12 and 13 form a platform for supporting the sheets of material 14 which are to be welded. Arms 15 on either side of table 10 are provided with rollers 16 over which sheets 14 pass in their movement through the machine.

The magnet frame is provided with flat sheet supporting pole pieces 17 against which the sheet edges are held by flexible jaw members 18 and rigid beams 19 extending across these pole pieces. Jaw members 18 are located between beams 19 and pole pieces 17, and pressure is transmitted from the beams to the jaw members through a plurality of helical compression springs 20 located between and spaced lengthwise thereof.

An atomic hydrogen torch 21 is provided for welding the seam between the sheets. This torch is mounted on a handle 22 which is spring biased into frictional engagement with a collar 23 on an arm 24 by a spring 25. Handle 22 may be rotated about arm 24 from a welding to a non-welding position and is maintained in these positions by its frictional engagement with collar 23 on arm 24.

Arm 24 is mounted on an angular support 26 and is provided with a vertical screw adjustment operated by a crank 27 for raising and lowering the arm and consequently raising and lowering the atomic hydrogen torch 21 relatively to the seam to be welded. Member 26 is supported for horizontal movement on a carriage 28. This horizontal movement is provided by a screw adjustment having an operating crank 29. The carriage 28 may be moved along guideways 30 by a lead screw 31 extending along the guideways which are supported at each end by legs 32 mounted on box beam 13. This movement may be secured by operation of a hand wheel 33 or through reduction gearing 34 mounted on one end of the guideway frame. Power is supplied to this reduction gearing by a motor 35 mounted on a frame 36 one end of which is pivoted to an arm 37. This arm is mounted on one end of box beam 12 and acts as a support for a clutch 38 and its operating handle 39. Motor 35 is belt-connected with this clutch, and the clutch in turn is belt-connected with the input pulley of the reduction gearing 34. Guards 40 and 41 are provided about these belts.

The ends of oppositely disposed beams 19 and jaw members 18 are connected by pairs of rods 42 and 43 with pairs of fluid operated means 44 and 45 mounted on the inside ends of table 10. These fluid operated means are piston and cylinder arrangements, the cylinder being supported on the table and the piston being connected to the rods.

A source of fluid pressure is connected through a hose 46 and a pipe 47 to adjustable pressure regulators 48 and 49. These pressure regulators in turn are connected through hoses 50 and 51 through three-way valves 52 and 53 to the fluid operated means 44 and 45. These valves control the application of fluid pressure to either side of the pistons of means 44 and 45 and exhaust to air from either side of these pistons. With this arrangement pressure regulator 48 determines the amount of fluid pressure applied to the fluid operated means 44, and pressure regulator 49 determines the amount of fluid pressure applied to fluid operated means 45. The amounts of these fluid pressures are indicated by the pressure gages 54 and 55 associated with the regulators 48 and 49. It is thus possible to have a differential in the clamping pressures applied by the beams and jaw members to the sheets on opposite sides of the seam being welded. It is sometimes desirable to clamp one sheet edge with less pressure than the other sheet edge so that one of the sheet edges is free to move during welding without disturbing the alignment of the seam which is maintained by the more forceful clamping of the other sheet edge.

These pressure regulators and valves 52 and 53 are conveniently located at the operator's station which is in front of the machine, as illustrated in Fig. 1. Control switches 56, 57, 58, and 59 are also provided at this end of the machine. Switches 56 control motor 35 and thereby control the travel of torch 21 along the seam to be welded. Switches 57, 58, and 59 control torch 21 and the energization of magnet frame 11. As shown in the drawings, this frame comprises a plurality of magnetic core members 60 whose ends are connected through a magnetic circuit with the pole pieces 17 of the magnet frame. Each of the cores 60 is provided with a winding 61.

As pointed out in my application Serial No. 478,236, filed concurrently herewith, an arc is struck between the electrodes of the atomic hydrogen torch by an arc striking mechanism which may be energized only after windings 61 of magnet frame 11 have been energized. As also pointed out in this application, hydrogen and arcing current are supplied to the torch through an electromagnetically operated switch and valve means, and a time delay means is provided for delaying the closing of the valve for a predetermined time interval after the connection of the electrodes with the source of arcing current has been interrupted. This portion of the welding apparatus is in part illustrated in Figs. 1 and 2 of the drawings, but, since it does not relate to the present invention, it will not be identified and described.

As previously stated, the abutting ends of sheets 14 are held on the flat pole pieces 17 of the magnet frame by jaw members 18 which are located between the pole pieces and beams 19 extending across them. These jaw members are flexible and are forced into engagement with the work by a plurality of helical compression springs 20 located between and spaced lengthwise thereof. As best shown in Figs. 3 and 4, one end of each spring is seated about a pin 62 and its other end is seated on a washer 64 which is engaged by an adjusting screw 65. Pins 62 and screws 65 are spaced lengthwise of the beams and jaw members in registering positions. Consequently, by adjusting screws 65 in beams 19 the distribution of pressure applied by these beams to the jaw members 18 may be controlled so as to bring jaw members 18 into a uniform engagement with the sheets 14 on pole pieces 17.

These jaw members are provided with heel and toe portions extending lengthwise thereof. The toe portion has a tapered edge which engages the sheet near the seam to be welded and a flat heel portion which engages the sheet along a zone spaced from the seam on the other side of its toe portion. The flexibility of the jaw members and of their toe portions makes it possible by a proper adjustment of screws 65 to bring their edge portions uniformly into engagement with the sheets. Their clamping adjustment should be checked with paper three ten-thousandths inch thick or by taking a sight under the jaw member for light leaks from an electric lamp placed between them. If the edges of the jaw members are damaged or become worn they may be removed from the machine and re-dressed in a planer. Care must be exercised to see to it that they are held flat during this operation.

Operating rods 42 and 43 for beams 19 and jaw members 18 pass freely through holes 66, 67, and 68 respectively located in the pole pieces 17 of the magnet frame, in the arms 63 which are attached to the ends of the jaw members, and in the beams 19. When moved downward they engage beams 19 through nuts 69 and washers 70. When moved upward they engage arms 63 through the agency of collars 71. The arrangement is such that when the rods are moved downwardly collars 71 disengage arms 63 before pressure is applied to beams 19 through nuts 69 and washers 70, and when moved upwardly the pressure connection between beams 19 through nuts 69 and washers 70 is disengaged before collars 71 engage arms 63 and raise the jaw members.

Jaw members 18 are positioned relatively to pole pieces 17 of the magnet frame by pins 72 which are located in one end of blocks 73. The top surfaces of these blocks are flush with the top surfaces of pole pieces 17 and fit in grooves in the pole pieces for lengthwise movement. They are adjusted toward and away from the gap between the pole pieces of the magnet frame by adjusting screws 74 which engage and are held by flanged edge portions of the pole pieces which close the ends of the grooves for these blocks. They are held in adjusted position in the pole pieces by bolts 75.

Pins 72 extend into pin sockets 76 located in the under surface portion of the jaw members between their heel and toe portions. In making this connection they extend through perforations in the edge portions of sheets 14. These perforations are of larger size than the pins so that a slight movement of the sheets is possible for alignment with the air gap 77 between the pole pieces. A bar of non-magnetic material 78 extends lengthwise of this air gap and is located between pole pieces 17 and the magnet frame. Passageways 79 and 80 for cooling fluid extend lengthwise of bar 78 and the toe portions of jaw members 18.

In the modification of the work clamp illustrated in Figs. 6 and 7, a non-magnetic bar 81 of triangular cross section forms a ridge between the flat sheet supporting surfaces of pole pieces 17 at the gap between them. As shown in Fig. 7 the seam edges of sheets 14 are held against this bar and crimped to stiffen them during the welding operation. As also shown in Fig. 7 the sheets are arranged relative to bar 81 so that the seam between them extends along the projecting edge portion of the bar. In this modification, the non-magnetic bar 78 between the pole pieces 17 extends to the sheet supporting surfaces of the pole pieces into engagement with the base of the triangular bar.

The guide for directing sheets 14 through the work clamp is illustrated in Figs. 5 and 6. As shown in Fig. 5, it comprises a flanged base portion 82 and a top portion 83 having flanged end portions which space it from the base portion 82 and form a passageway for sheets 14. One flanged end portion of the top is attached to its base 82, and the other flanged end portion rests thereon and is provided with a rounded lip to facilitate its endwise passage over the welded sheets. The base portion 82 is provided with a handle 84 and a notch 85 for accommodating triangular bar 81. The construction and dimensions of this guide bar are such that when in position between the pole pieces 17 and jaw members 18, it is located between and held by guide pins 72 on the surfaces of the pole pieces. The base portion is thick enough to lie above the ends of pins 72 when so positioned.

The welding machine above described forms part of a grouping of machines including a takeoff roll and a combined punch press and shear located to the left of the welding machine as illustrated in Fig. 1, and a sheet slitter and a reeler located to the right of the machine. The ends of the sheets delivered from the takeoff roll are punched and sheared to provide them with straight edge portions which are definitely located and spaced from the perforations so that when the sheet edges are positioned in the welding machine by placing their perforated end portions over guide pins 72, the cut edge portions of the sheets are properly aligned over the air gap 77 between pole pieces 17 of the magnet frame.

When the welded sheets are moved from the machine and a new sheet brought into position in the machine, guide bar 82, 83 is inserted between jaw members 18 and pole pieces 17 to protect pins 72 and the tapered toe portions of the jaw members from the abrading effects of the sheets while passing through the clamp.

Thereafter the guide bar is removed and excitation applied to the windings 61 of the magnet frame. As previously stated the sheet edges are positioned by guide pins 72 extending through the perforation therein and when the magnet frame is excited the edges of the sheets pull together due to their magnetic attraction. Before clamping pressure is applied, the seam between the sheets may be moved slightly in order to bring it directly over air gap 77.

The operator then applies clamping pressure predetermined by pressure regulators 48 and 49 to each of the seam edges by admitting fluid pressure to fluid operated means 44 and 45. The admission of fluid pressure thereto causes the pairs of rods 42 and 43 to descend applying clamping pressure to rigid beams 19. These beams transmit the clamping pressure through springs 20 to jaw members 18. As previously stated, these jaw members are definitely positioned parallel with the seam by guide pins 72 engaging pin sockets 76 in the jaw members. A proper adjustment of springs 20 will produce a uniform work engaging pressure contact between the tapered toe portions of the jaw members and the edges of the sheets on opposite sides of the seam.

The sheets are now held in proper position for welding which is performed by swinging torch 21 into position and moving it along the seam through the agency of motor 35. The spacing of the torch from the seam may be controlled by raising or lowering support arm 24 therefor through the agency of hand crank 27, and its horizontal position is determined by an adjustment of crank 29. The control of the torch and its construction have been fully described in my above referred to application Serial No. 478,236.

After each welding operation, the torch is swung away from the work clamp and the clamp released by operating valves 52 and 53 to admit fluid pressure to fluid operated means 44 and 45 for raising rods 42 and 43. During the upward movement of these pairs of rods the clamping pressures applied to beams 19 are first released and their jaw members 18 are raised from the sheet edges. Guide bar 82, 83 may then be placed in position as illustrated in Fig. 6 between the jaw members and the pole pieces with the welded sheets 14 located in the passageway between its top and bottom portions. The welded sheets are then withdrawn toward the right of the welding machine as illustrated in Fig. 1 and passed through the slitter and thence to the reeler where the slitted portions are wound into adjacently located coils of sheet material.

From what has been stated above, it is apparent that I have provided a sheet clamp which may be adjusted to provide a uniform work engaging contact and heat stop along each edge of the seam during welding. The jaw members may readily be removed from the clamp when their edges are damaged or become worn and are of such a nature that they may be held in a planer for performing this operation. Care must be exercised when planing the edges of the jaw members to see to it that they are held in flat position in the planing machine.

Inequalities in clamping pressure resulting from deflection of the clamp beams 19 may be corrected by an adjustment of compression springs 20 which transmit clamping pressure from the beams to the jaw members. This same spring construction will also provide an automatic adjustment which compensates for slight inequalities in the thicknesses of the plates being welded. By adequately cooling the toe portions of the jaw members and the adjacent edge portions of the pole pieces through the agency of bar 77 located therebetween, the heat of welding is kept from running back into the sheets and producing distortion effects that can not be tolerated during welding. Furthermore when the triangular crimp bar 81 is employed the edges of the sheets are further stiffened by being folded at the seam between them. The ridge in the welded sheet resulting from the use of this crimp bar will be in large measure straightened out during the further processing of the welded sheets. If found necessary, a separate hammering or rolling operation may be employed for flattening it.

My invention is not limited to the particular detailed construction illustrated and described above. Neither is it limited to apparatus for atomic hydrogen welding, since many or all of its features may be used for gas, arc or gas-arc welding apparatus. I aim, therefore, to cover in the appended claims all such modifications as fall within the true spirit and scope of my invention as set forth by the appended claims.

What I claim as new and desire to secure by Letters Patent of the United States is:

1. A welding clamp comprising a rigid support, a rigid beam extending across said support, a flexible jaw member between said beam and said support, means including a plurality of spring members located lengthwise of and between said beam and said jaw member for transmitting clamping pressure from said beam to said jaw member, means for individually adjusting the pressures transmitted by each of said springs from said beam to said jaw member, and means for moving said beam and said rigid support relatively to one another to bring said jaw member into clamping engagement with said support.

2. A welding clamp comprising a rigid support, a rigid beam extending across said support, a flexible jaw member extending across said support and located between said beam and said support, means for moving said beam toward and away from said support, helical compression springs located between and spaced lengthwise of said beam and said jaw member, seats for said springs in and spaced lengthwise of said jaw member, and means including adjusting screws in and spaced lengthwise of said beam for individually adjusting the pressures exerted by said springs on said jaw member by said beam.

3. A welding clamp comprising a rigid support, a rigid beam extending across said support, a flexible jaw member between said beam and said support, means including a plurality of spring members located lengthwise of and between said beam and said jaw member for transmitting clamping pressure from said beam to said jaw member, means for individually adjusting the pressures transmitted by each of said springs from said beam to said jaw member, means including rods extending through the end portions of said beam and said jaw member for moving said beam and said jaw member toward and away from said support, connections between said rods and said beam for applying clamping pressure between said beam and said support, and connections between said rods and said jaw member effective only for moving said jaw member away from said support after movement of said rods has released clamping pressure between said beam and said support.

4. A welding clamp comprising a support, a jaw member extending across said support, means including a plurality of pins and pin sockets in said support and said jaw member for positioning a work engaging portion of said jaw member parallel with a desired line of welding in the work also positioned on said support by said pins, means for individually adjusting the position of said pins relative to said line of welding, and means for moving said jaw member into clamping engagement with a work part on said support and to separate said jaw member from said support a distance sufficient to provide between said jaw member and said support a work passageway which is unobstructed by said pins.

5. A welding clamp comprising a work support, a plurality of jaw members extending across said support, means including a plurality of pins and pin sockets in said support and said jaw members for positioning work engaging portions of said jaw members relatively to said support on opposite sides of and parallel with a desired line of welding along said support, means for moving said work engaging portions of said jaw members into clamping engagement with sheet material on said support and away from said support a sufficient distance to provide a sheet passageway between said jaw members and said support unobstructed by said locating pins, and means held in place by said pins and adapted to be inserted between said support and said jaw members for guiding said sheet material over said pins and for protecting said pins and said work engaging portions of said jaw members from the abrading effects of said sheets during their passage through said clamp.

6. A clamp for holding sheet material in position for welding comprising a rigid magnet frame having sheet supporting pole pieces of magnetic material separated from one another by a narrow air gap at their sheet supporting surfaces, means for establishing a magnetic field between said pole pieces, a bar of nonmagnetic material between said pole pieces and spaced from their sheet supporting surfaces, cooling means extending lengthwise of said bar, a rigid beam individual to and extending across each of said pole pieces, a flexible jaw member individual to and extending across each of said pole pieces between which and said beam associated therewith it is located, said jaw member having heel and toe portions extending lengthwise thereof and limiting to the edge and a zone spaced from the edge its engagement with a sheet of material located on each of said pole pieces with the seam between said sheets aligned with the air gap between said pole pieces, cooling means extending lengthwise of the toe portions of each of said jaw members, means including a plurality of spring members located lengthwise of and between said beams and said jaw members for transmitting clamping pressure from said beams to said jaw members, means for individually adjusting the pressures transmitted by each of said springs from said beams to said jaw members, and means for moving said beams and said magnet frame relatively to one another.

7. A clamp for holding sheet material in position for welding comprising a rigid magnet frame having flat sheet supporting pole pieces of magnetic material separated from one another by a narrow nonmagnetic gap corresponding in configuration to the seam to be welded between sheets of material whose end portions are supported on said pole pieces, means for establishing a magnetic field between said pole pieces, a rigid beam individual to and extending across each of said pole pieces, a flexible jaw member individual to and extending across each of said pole pieces between which and said beam associated therewith it is located, means including a plurality of pins and pin sockets in said magnet frame and said jaw members for positioning said jaw members relative to said frame on opposite sides of and parallel with said nonmagnetic gap between said pole pieces and the seam to be welded between sheets of material also positioned on said frame by said pins engaging said sheets through perforations in their end portions, means including a plurality of spring members located lengthwise of and between said beams and said jaw members for transmitting clamping pressure from said beams to said jaw members, means for individually adjusting the pressures transmitted by each of said springs from said beams to said jaw members, and means for moving said beams and said magnet frame relatively to one another to bring said jaw members into and out of clamping engagement with the end portions of sheet material located on said pole pieces of said magnet frame.

8. A clamp for holding sheet material during welding comprising a rigid support, a rigid beam extending across said support, a flexible jaw member between said beam and said support, said jaw member having its sheet engaging surfaces limited to heel and toe portions which extend lengthwise thereof and are spaced from one another and having its said toe portion tapered to a narrow sheet engaging edge which is deformable under clamping pressure to conform to inequalities in thickness of a sheet of material on said support, cooling means extending lengthwise of the toe portion of said jaw member, means including a plurality of spring members located lengthwise of and between said beam and said jaw member for transmitting clamping pressure from said beam to said jaw member, means for individually adjusting the pressures transmitted by each of said springs from said beam to said jaw member, and means for moving said beam and said support relatively to one another to bring said jaw member into clamping engagement with a sheet of material on said support.

9. A welding clamp comprising a support having angularly disposed surfaces which intersect one another along a line of welding and form on said support between flat surfaces thereof a ridge of triangular cross section which crimps and stiffens the edges of sheets of material held on said support with the welding seam between them extending along the projecting edge portion of said ridge, jaw members on each side of said ridge having edge portions parallel with and spaced from said ridge, and means for moving said jaw members and said support relatively to one another into and out of clamping engagement with said sheets of material located on said support with their end portions resting on said angularly disposed surfaces of said ridge and the seam between said sheets extending along the line of welding at the line of intersection of said angularly disposed surfaces of said ridge.

10. In a machine for welding sheet material, a support having angularly disposed surfaces which intersect one another along a line of welding and form on said support between flat surfaces thereof a ridge of triangular cross section which crimps and stiffens the edges of sheets of material held on said support with the welding seam between them extending along the projecting edge portion of said ridge, jaw members extending across said support on opposite sides of said ridge, means including a plurality of pins and pin sockets in said support and said jaw members for positioning the sheet engaging edges of said jaw members relatively to said support on opposite sides of and parallel with said ridge and said line of welding between sheets of material also positioned on said support by said pins engaging said sheets through perforations in their end portions, and means for moving said jaw members into clamping engagement with sheet material on said support and away from said support a sufficient distance to provide a sheet passageway between said jaw members and said support unobstructed by said locating pins and said ridge.

11. In a machine for welding sheet material, a support having angularly disposed surfaces which intersect one another along a line of welding and form on said support a ridge of triangular cross section, jaw members extending across said support on opposite sides of said ridge, means including a plurality of pins and pin sockets in said support and said jaw members for positioning the sheet engaging edges of said jaw members relatively to said support on opposite sides of and parallel with said ridge and said line of welding between sheets of material also positioned on said support by said pins engaging said sheets through perforations in their end portions, means for moving said jaw members into clamping engagement with sheet material on said support and away from said support a sufficient distance to provide a sheet passageway between said jaw members and said support unobstructed by said locating pins and said ridge, and means held in place by said pins and adapted to be inserted between said ridge on said support and said jaw members for guiding said sheet material over said ridge and said pins and for protecting said ridge, said pins and said jaw members from the abrading effects of said sheets during their passage through said clamp.

GARETH G. SOMERVILLE.